(12) United States Patent
Holcombe et al.

(10) Patent No.: US 9,616,592 B1
(45) Date of Patent: Apr. 11, 2017

(54) MODULAR CONVEYOR ASSEMBLY CASSETTE

(71) Applicant: HOLCOMB MIXER, Ault, CO (US)

(72) Inventors: Brent Anthony Holcombe, Ault, CO (US); James K. Brewster, Evans, CO (US)

(73) Assignee: Holcombe CVI, LLC, Amarillo, TX (US)

( * ) Notice: Subject to any disclaimer, the term of this patent is extended or adjusted under 35 U.S.C. 154(b) by 642 days.

(21) Appl. No.: 13/868,404

(22) Filed: Apr. 23, 2013

(51) Int. Cl.
 *B28C 7/04* (2006.01)
 *B28C 9/04* (2006.01)
 *B65G 17/02* (2006.01)

(52) U.S. Cl.
 CPC .............. *B28C 9/049* (2013.01); *B65G 17/02* (2013.01)

(58) Field of Classification Search
 CPC .................................................. B28C 7/0472
 USPC ....................................................... 366/27, 30
 See application file for complete search history.

(56) References Cited

U.S. PATENT DOCUMENTS

| | | | | |
|---|---|---|---|---|
| 675,037 A | * | 5/1901 | Drake | B28C 5/4272 366/30 |
| 3,451,659 A | * | 6/1969 | Tobolov | B01F 7/042 366/27 |
| 3,456,925 A | * | 7/1969 | Gallagher | B28C 9/0463 366/27 |
| 4,023,779 A | * | 5/1977 | Beloy | B28C 5/40 366/20 |
| 2002/0034120 A1 | * | 3/2002 | Guntert, Jr. | B28C 7/0495 366/2 |

\* cited by examiner

*Primary Examiner* — David Sorkin
(74) *Attorney, Agent, or Firm* — Craig R. Miles; CR Miles P.C.

(57) ABSTRACT

A modular conveyor assembly employable with a materials mixing system is provided that includes an elongate frame supporting a motor driven axle, an idler axle, and a plurality of rollers supported in individual rotational fashion by the frame, and a belt and chain subassembly configured to be cycled rotationally about the axles and rollers, where the belt and chain subassembly includes first and second chains each attached along first and second sides of the belt, respectively, so that the belt and chains move in unison, and wherein the frame is configured to be detachable from a materials mixing system without the need to disassemble substantial components of the modular conveyor assembly.

3 Claims, 13 Drawing Sheets

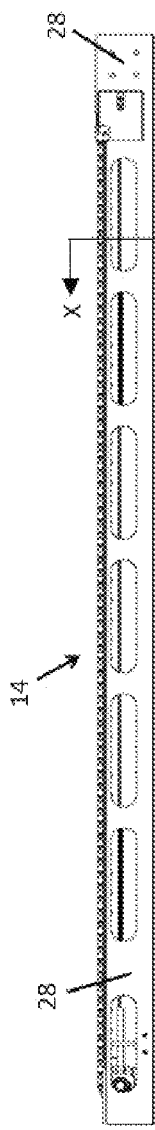
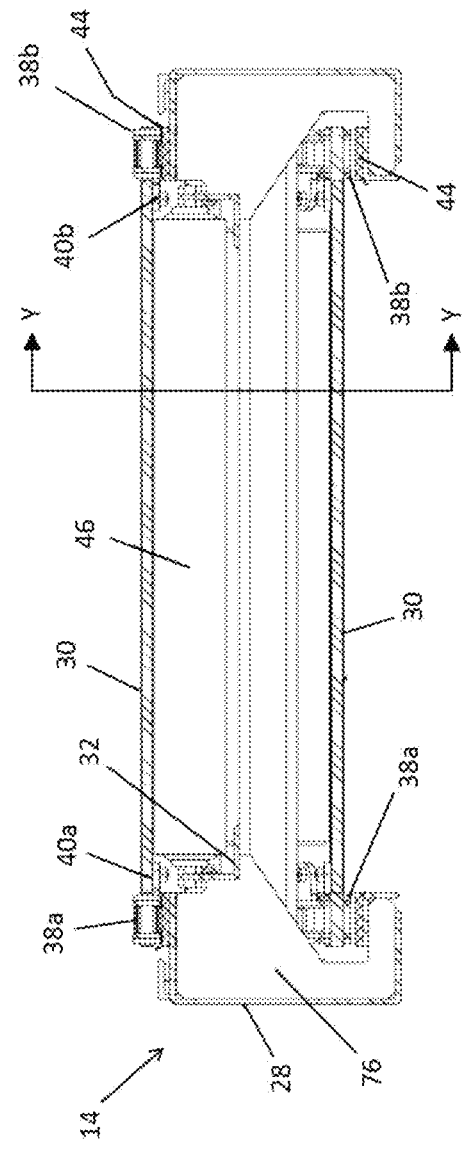
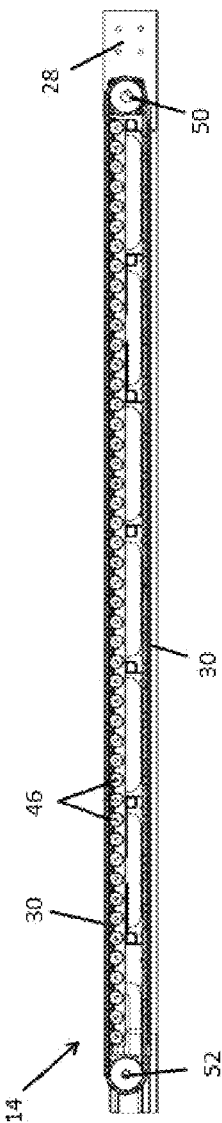
FIG. 3A
FIG. 3B
FIG. 3C

MODULAR CONVEYOR ASSEMBLY CASSETTE

BACKGROUND

The embodiments herein relate generally to a conveyor assembly for transporting material. One application for embodiments of the conveyor assembly is, by way of example only, in the conveyance of aggregate materials in a volumetric concrete mixing system, or other system that requires the transport of materials from one place to another within the system. The embodiments herein more specifically relate to a modular conveyor assembly cassette system configured to facilitate removal of the assembly system without the need to disassemble parts of the conveyor system.

In the context of volumetric concrete mixing systems, for example, multiple bins are provided for storing discrete components intended to be mixed together for dispensing from the system a mixture of the components in the form of concrete. Such systems are often transportable on the roadway, and serve to function as a ready-made supply of concrete by simply loading on-site (or loaded at a remote site and transported to the desired location) the individual components that are then mixed together to dispense the concrete on-site. Often, aggregate conveyor systems on volumetric concrete mixers must fit within a very tight space in the mixer aggregate bin in order to allow the mixer body to fit on a standard heavy truck frame that is typically 35" to 38" wide across the world.

Volumetric concrete mixing systems generally include a transport mechanism within the system to transport the materials from holding bins within the system to an area where the components can be brought together and mixed for dispensing the mixture. The transport mechanism is often in the form of a conveyor assembly integrated into the overall mixing system. There are at least a few limitations with such systems. One, the conveyor assembly causes inefficient transport because it is configured to drag the belt and mating supporting cross bars across a base, which causes unnecessary wear and energy loss due to drag. Another is that the repair and/or replacement of the conveyor assembly within the mixing system requires at least partial disassembly of the conveyor assembly in order to remove it from the mixing system. Embodiments of the present system overcome at least one or both of these limitations, and possibly others as well.

SUMMARY

At least one embodiment of a materials mixing system is provided for storing and mixing materials to create a mixture to be dispensed, the materials mixing system comprising (a) a plurality of bins, each configured to store one or more materials desired to be mixed with one or more materials stored in one or more of another of the plurality of bins, (b) a modular conveyor assembly configured for detachable engagement with a materials mixing system in which materials may be transported from one position to another position within the materials mixing system, the modular conveyor assembly being configured so that detachment of the assembly from the materials mixing system does not require disassembly of components of the modular conveyor assembly to facilitate repair and/or replacement of the assembly, the modular conveyor assembly being further configured to transport materials more efficiently by reducing the friction of adjoining components configured to move relative to each other; (c) a mixing assembly configured to mix the desired materials in a fashion suitable for dispensing of the materials when desired, and (d) a dispensing mechanism for delivering the mixture to a desired location.

In some embodiments, the materials mixing system may be portable, such as a truck configured to carry the weight of the materials mixing system to a site where the materials may be mixed and/or the mixture dispensed. Preferably, the modular conveyor assembly comprises a unitary belt and chain subassembly for delivering material to the mixing assembly and returning to bring additional material in a cycling format. In some embodiments, the unitary belt and chain subassembly comprises a belt sufficiently durable to support the material to be transported but sufficiently resilient to permit cycling of the belt and chain subassembly along a longitudinal axis of a support frame in a delivery-and-return fashion, and first and second chains each attached along first and second sides of the belt, respectively, so that the belt and chains move in unison; at least one of the chains configured to engage the motor-driven axle so as to permit cycling of the belt and chain subassembly for the transport of materials within a materials mixing system.

In some embodiments, a modular conveyor assembly is provided that is configured for detachable engagement with a materials mixing system in which materials may be transported from one position to another position within the materials mixing system, with the modular conveyor assembly being configured so that detachment of the assembly from the materials mixing system does not require disassembly of components of the modular conveyor assembly to facilitate repair and/or replacement of the assembly. Embodiments of the modular conveyor assembly are preferably configured to transport materials more efficiently by reducing the friction of adjoining components configured to move relative to each other by eliminating moving cross bars and/or employing frictionless support materials upon which a chain or other moving parts may slide.

In some embodiments, the modular conveyor assembly comprises (a) an elongate frame configured to support at least one motor driven axle and an idler axle, both axles being aligned generally perpendicular to a longitudinal axis of the frame and generally parallel to each other; (b) a plurality of rollers supported in individual rotational fashion by the frame in general alignment with the motor drive and idler axles; and (c) a belt and chain subassembly configured to be cycled rotationally about the motor drive and idler axles and the plurality of rollers, the belt and chain subassembly comprising a belt sufficiently durable to support the material to be transported but sufficiently resilient to permit cycling of the belt and chain subassembly along the longitudinal axis of the frame in a delivery-and-return fashion, the belt and chain subassembly further comprising first and second chains each attached along first and second sides of the belt, respectively, so that the belt and chains move in unison; at least one of the chains configured to engage the motor-driven axle so as to permit cycling of the belt and chain subassembly for the transport of materials within the materials mixing system. Preferably, embodiments of the elongate frame are configured to support in fixed but operational mode a substantial portion of the modular conveyor assembly components such that detachment of the frame from a materials mixing system results in the modular detachment of a substantial portion of the modular conveyor assembly components, eliminating the need to disassemble some of the substantial portion of the assembly components.

BRIEF DESCRIPTION OF THE FIGURES

The detailed description of some embodiments of the invention will be is made below with reference to the accompanying figures, wherein like numerals represent corresponding parts of the figures.

FIG. 3A shows a schematic side view of one embodiment of the present inventive modular conveyor assembly cassette;

FIG. 3B shows a cross-section of the embodiment of FIG. 3A across line X-X;

FIG. 3C shows a cross-section of the embodiment of FIG. 3B across line Y-Y;

DETAILED DESCRIPTION OF CERTAIN EMBODIMENTS

Figure 1A:
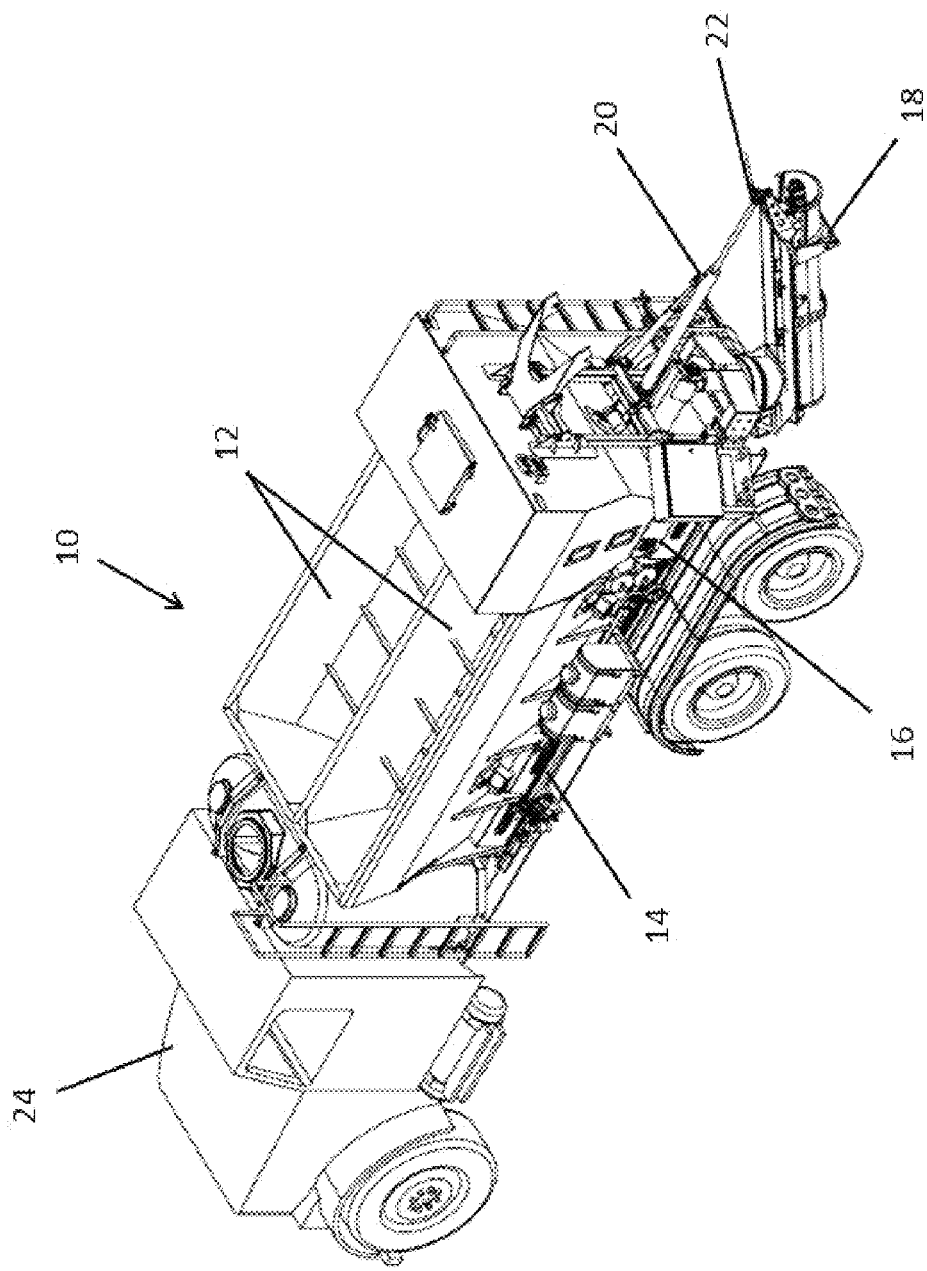
FIG. 1A shows a schematic of one example application (by example a volumetric concrete mixer) of an embodiment of the present inventive modular conveyor assembly cassette provided therein.
Figure 1B:
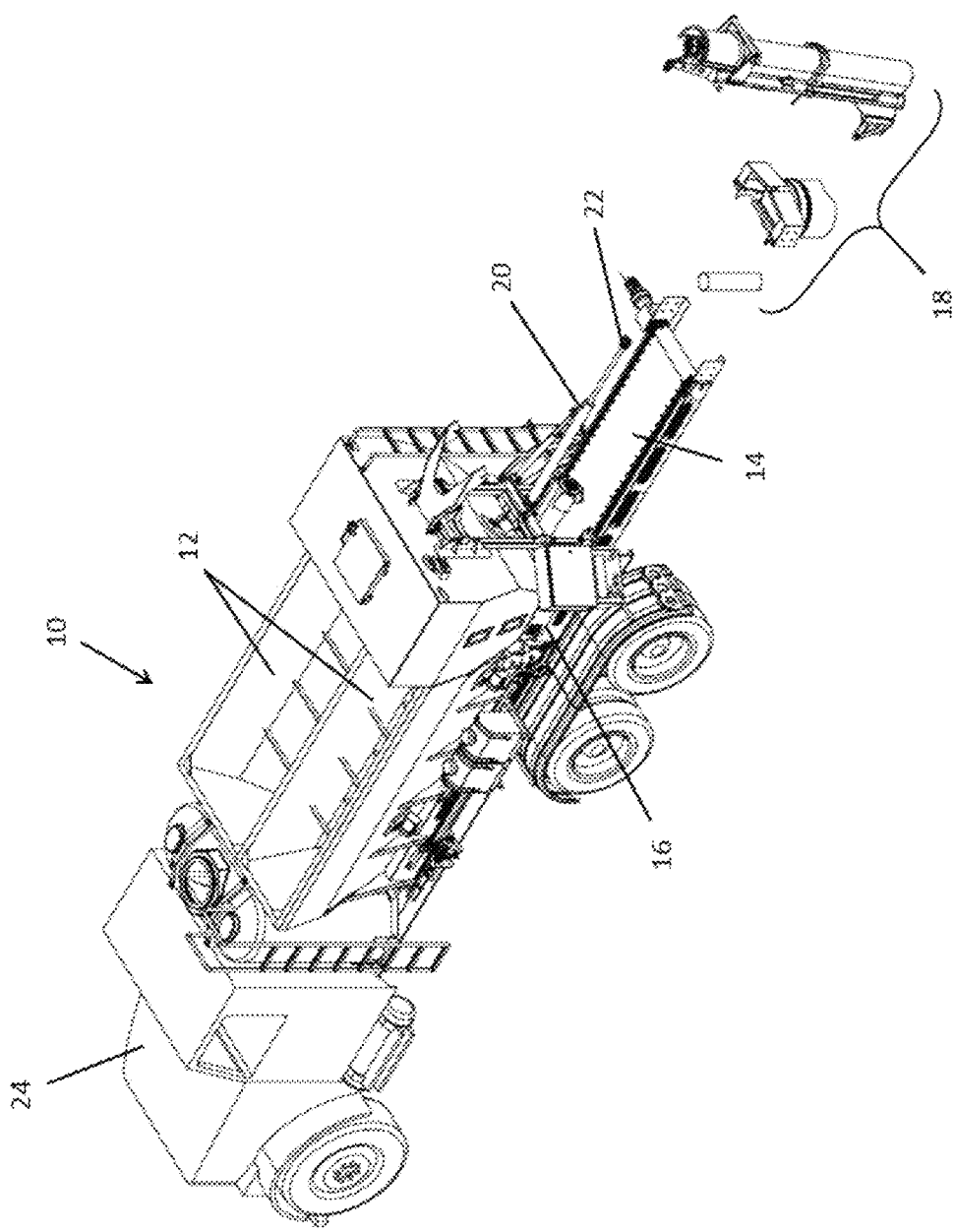
FIG. 1B shows the application and embodiment of FIG. 1A, with the modular conveyor assembly cassette embodiment shown partially removed from the example application of volumetric concrete mixer.
Figure 1C:
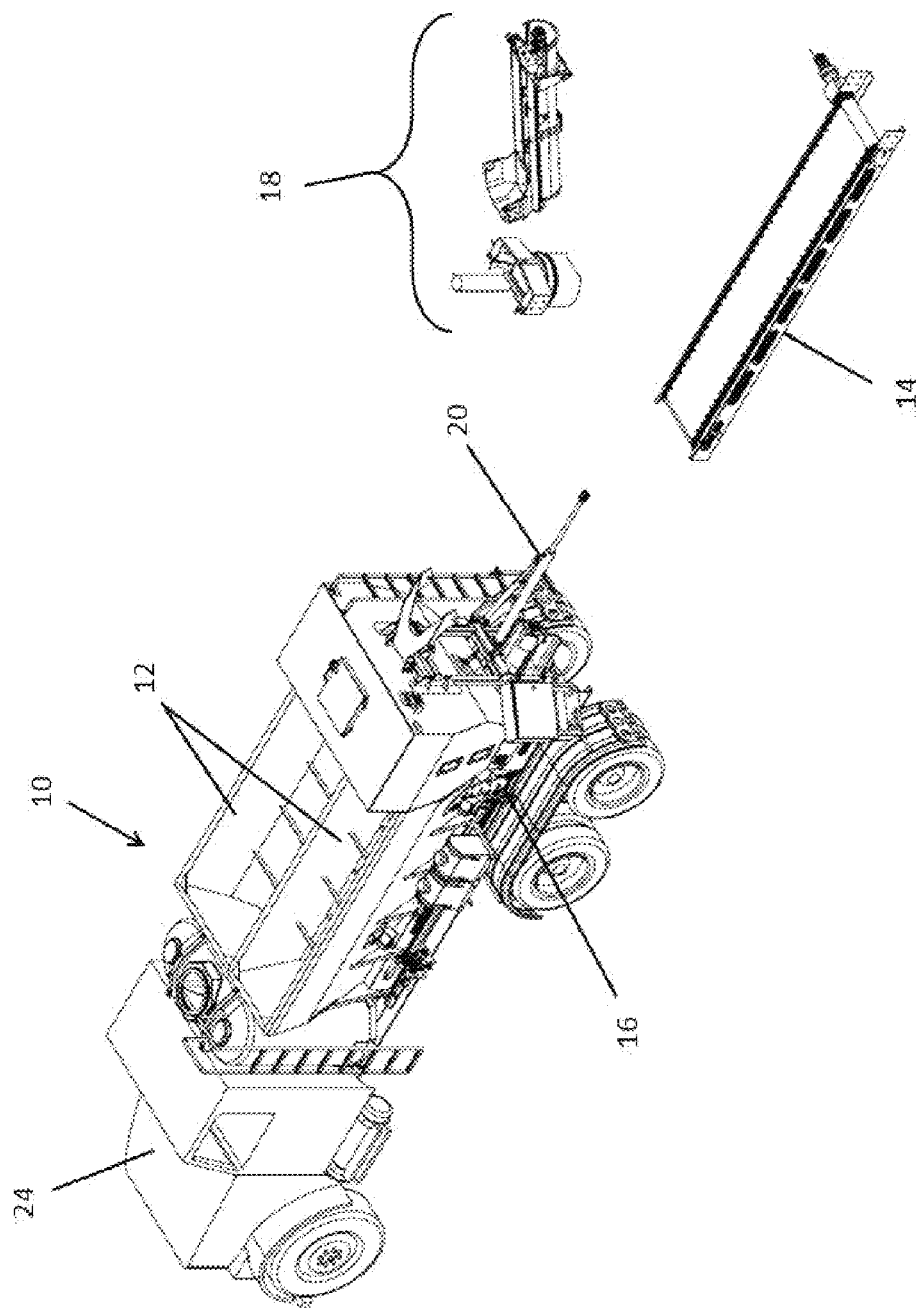
FIG. 1C shows the application and embodiment of FIG. 1A, with the modular conveyor assembly cassette embodiment shown fully removed.

By way of example, and referring to FIGS. 1A through 1C, one embodiment of the present system comprises a materials mixing system 10 comprising a plurality of material storage bins 12, a material transport assembly 14, a materials mixing assembly 16, and dispensing mechanism 18, a dispensing mechanism position controller 20, and a mechanism for connecting the dispensing mechanism 18 to the position controller 20. In one embodiment, the dispensing mechanism 18 comprises a chute configured to deliver concrete and the like, and the dispensing mechanism position controller 20 comprises an extendable and retractable shaft to lower and raise the end of the chute. Numerous configurations are contemplated for the dispensing of materials using dispensing mechanism and for controlling the position of the dispensing mechanism, not just those described and illustrated herein.

In one embodiment of the inventions herein, the materials mixing system 10 may be portable by securing the components of the system described above to a transport vehicle 24. The materials mixing system may comprise a volumetric concrete mixing system, or a system for mixing and dispensing other materials either of a construction nature or otherwise.

Referring specifically to FIGS. 1B and 1C, one embodiment of the materials mixing system comprises a material transport assembly 14 that is modular so that it may be removed almost substantially in its entirety from the materials mixing system 10 without the need to disassembly the transport assembly. In one embodiment, such as that shown in FIGS. 1B and 1C, and also particularly with respect to FIGS. 2A and 2B, access to the modular assembly 14 may be at one end of the materials mixing system 10 and can be removed in modular format by removing the dispensing mechanism 18 and associated position controller 20. In other embodiments, the modular transport assembly may be removed from the materials mixing system from a different location within the system.

Figure 2B:
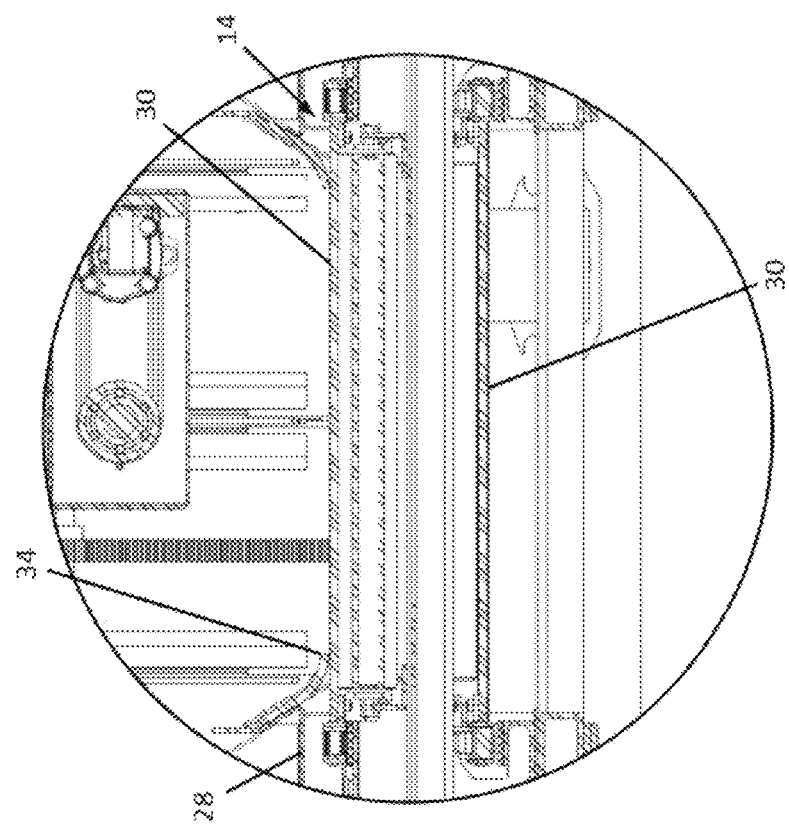
FIG. 2B shows enhanced detail of the rear portion of the one embodiment of the present inventive modular conveyor assembly cassette shown with Detail Z in FIG. 2A.
Figure 2A:
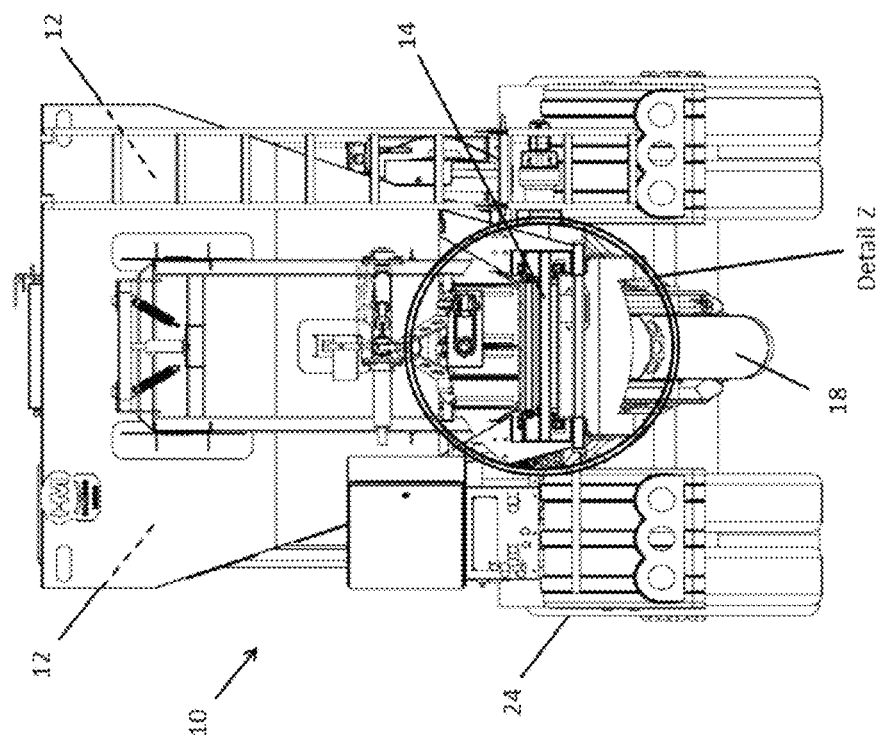
FIG. 2A shows a rear schematic view of the application and embodiment of FIG. 1A, with a rear portion of the one embodiment of the present inventive modular conveyor assembly cassette shown.
Figure 4B:
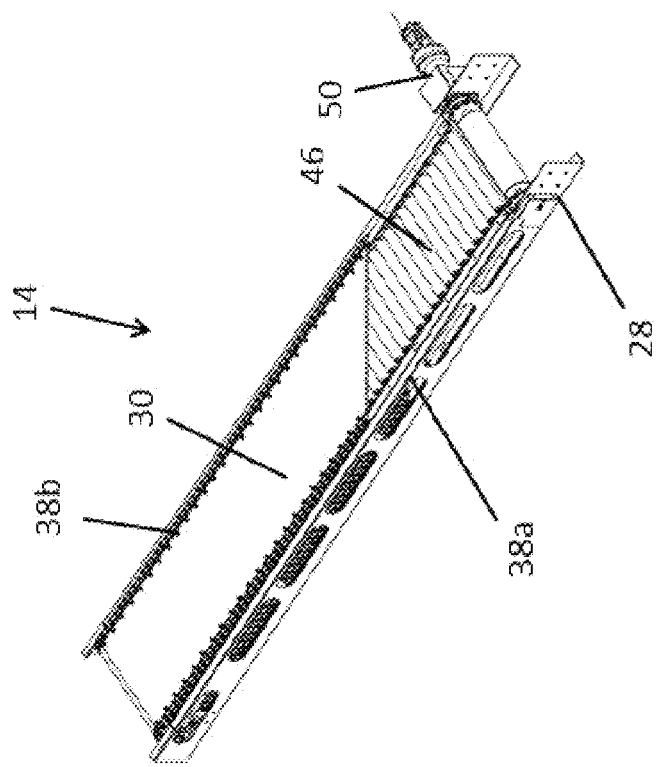
FIGS. 4A through 4D show perspective schematic views of embodiments of the present inventive modular conveyor assembly cassette, with varying components of the cassette displayed.
Figure 4A:
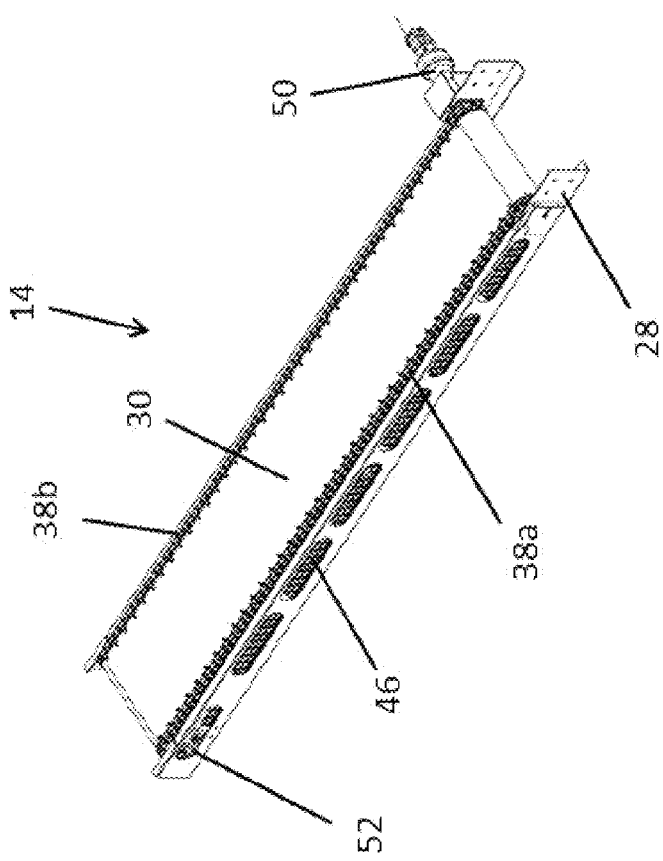
Figure 4D:
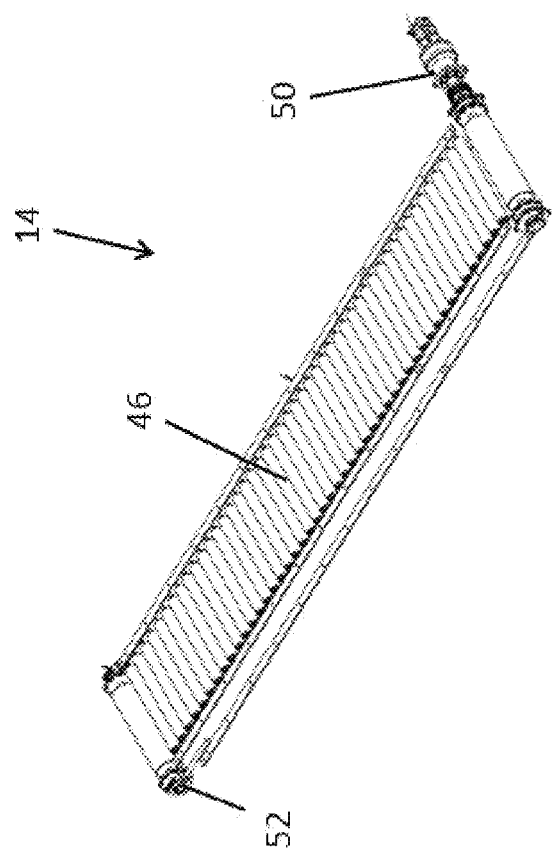
Figure 4C:
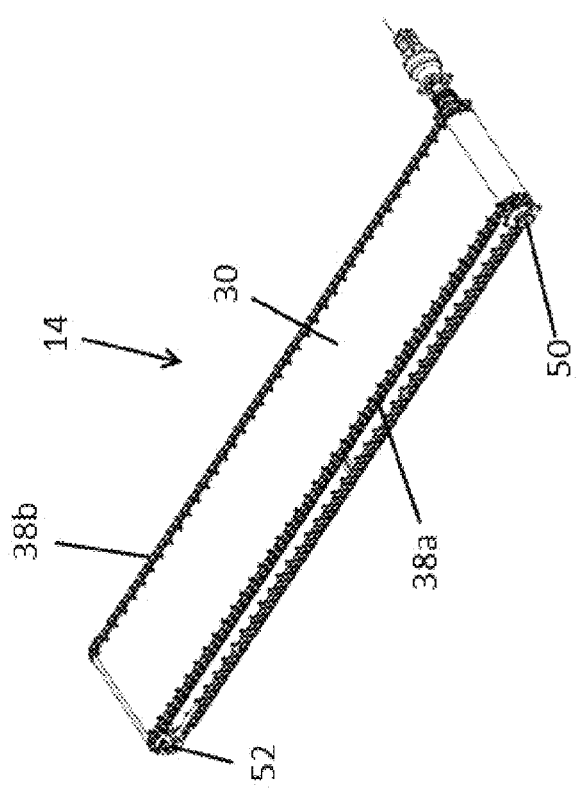

As the materials transport assembly bears a great deal of operational abuse, the assembly or parts thereof may need to be replaced fairly frequently. Or it may simply be that the assembly needs to be cleaned and tuned periodically. Providing an assembly that is modular facilitates such activities. Referring to FIG. 2B, one embodiment of a modular materials transport assembly 14 comprises a frame 28 supporting a cycling belt 30. The system may also include skirts 34 that are longitudinally positioned along the sides of the transport assembly to maintain materials being transported on the best 30; in other words, to keep the materials from falling off and creating dysfunction amongst moving components of the system, or simply reducing the resulting yield of the mixture.

Referring to FIGS. 3A through 3C, one embodiment of the modular material transport assembly 14 comprises a frame 28 for supporting the belt 30 where a first chain 38a and second chain 38b are directly connected to respective sides of the belt 30 so that both the chains and the belt move in unison in longitudinally cycling rotation through the assembly. Preferably, engagement of the chains to the belt may be accomplished using chain tabs 40a, 40b connected to chains 38a, 38b, respectively. Further details of the chains and tabs are discussed below.

It is contemplated that efficient movement of the belt/chain subassembly may be accomplished by providing low friction materials in the form of UHMW strips 44 and/or sheets available in the market place. Other low friction materials may be employed as well. In any case, the chain rides atop such low friction materials 44 and slides more easily with a very low coefficient of drag. Also, contributing to the efficient movement of the belt/chain subassembly may be accomplished by preferably supporting the belt by a plurality of rollers 46, each rotationally and independently supported by the frame 28 of the assembly. In one embodiment, such as that shown in FIGS. 3A through 3C, the belt and chain cycle in unison to carry material, where the weight of the material is born by the rollers without the need for the material to be borne by cross bars that are dragged along for the ride with the belt. Preferably, the belt/chain subassembly is driven by a motor-driven axle 50 positioned laterally across the assembly frame 28, with a mating idler axle shaft 52 in general parallel fashion. By providing a motor-driven axle 50 and a mating idler axle shaft 52 in the configuration as shown, with proper tensioning in spacing, effective and efficient transport of material may be achieved. It is contemplated that in some embodiments, for example those that are large and/or move great loads of material, a plurality of motor-driven axles may be employed. Similarly, if so desired, a plurality of idler axles may be provided as well.

The exact configuration of the modular assembly therefore may be modified to suit the load bearing needs of the materials mixing system, both in size, strength and overall configuration. Further details of at least the embodiments of the modular transport assembly described herein may be appreciated by viewing FIGS. 4A through 4D, in which the above-described components are shown in perspective view relative to each other.

Figure 5B:
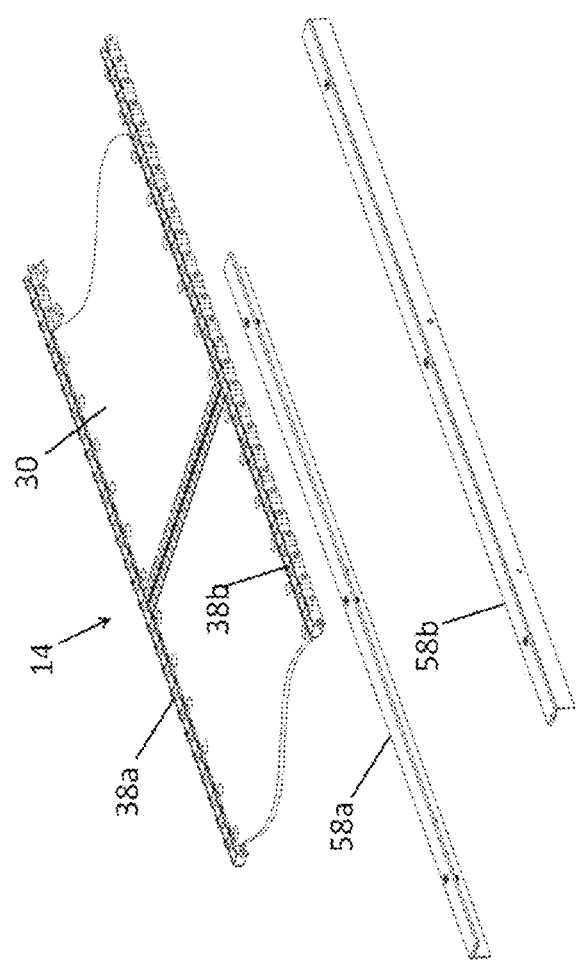
FIGS. 5A and 5B show details of an embodiment of a chain and belt assembly with an embodiment of the an inventive modular conveyor assembly cassette.
Figure 5A:
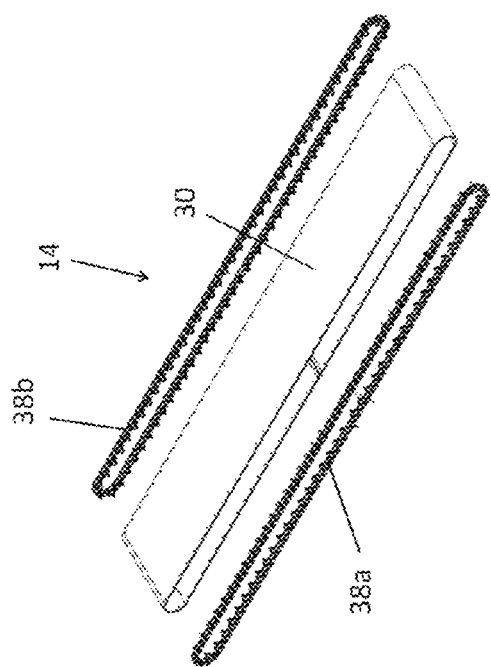
Figure 6B:
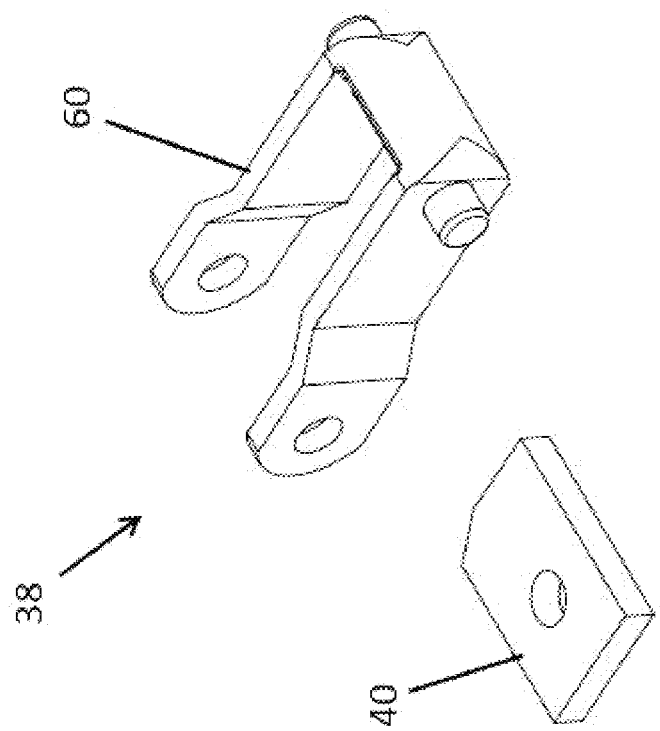
FIGS. 6A and 6B show further details of an embodiment of a chain link and chain link tab that may be employed within a chain and belt assembly with an embodiment of the an inventive modular conveyor assembly cassette.
Figure 6A:
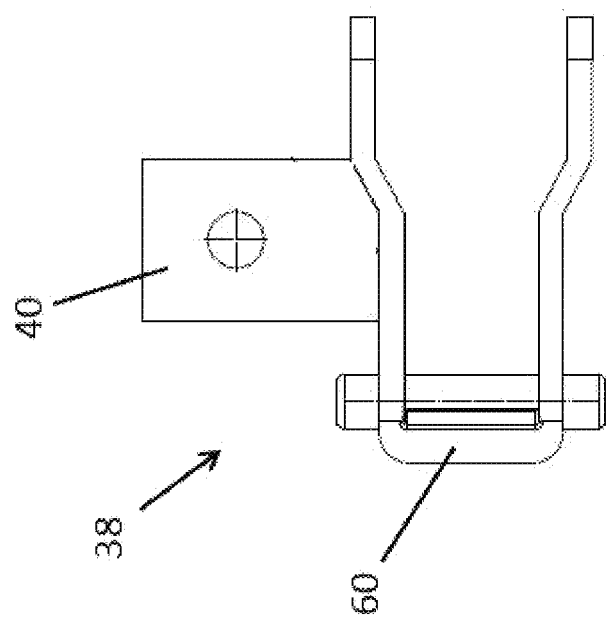

A beneficial feature of embodiments of the inventions herein, as alluded to above, is the unitary nature of the chain/belt subassembly. In that regard, one such embodiment is shown in detail in FIGS. 5A and 5B, where the belt 30 and chains 38a, 38b cycle in unison, wherein the chains are supported by chain rails 58a, 58b, respectively. The attachment of the chains to the belt may be accomplished by one of a number of ways that those of ordinary skill in the art shall appreciate. In one embodiment, referring to FIGS. 6A and 6B, each chain 38 comprises a plurality of links 60. Depending upon the design configurations desired, a tab 40 may be attached to one or more of the links 60 of chains 38 in a manner where the tabs extend inwardly toward the belt 30. Each tab comprises a hole that may be aligned with a corresponding hole in the side of the belt so that the belt may be fastened to the tabs and, thereby, the chains. In one embodiment, attaching a tab 40 to every other chain link 60 has shown to be an effective way to provide efficient unitary movement of the chain/belt subassembly. However, those of ordinary skill in the art may find that tabs are desired on every link, or every third or fourth link, if so desired, or maybe even less. The belt 30 may be fastened to the chain link tab 40 by one of a number of possible fastening systems, including elevator bolts.

Figure 7A:
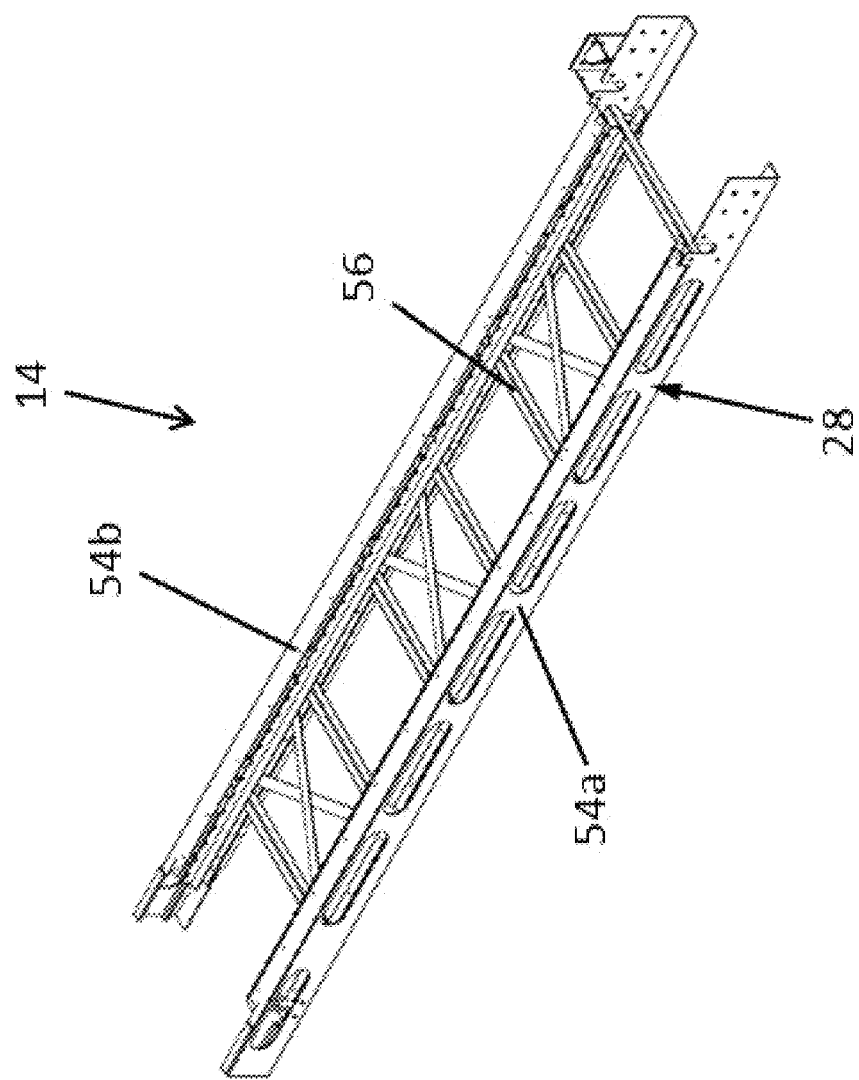
FIGS. 7A through 7D show details of an embodiment of the support frame for an inventive modular conveyor assembly cassette.
Figure 7B:
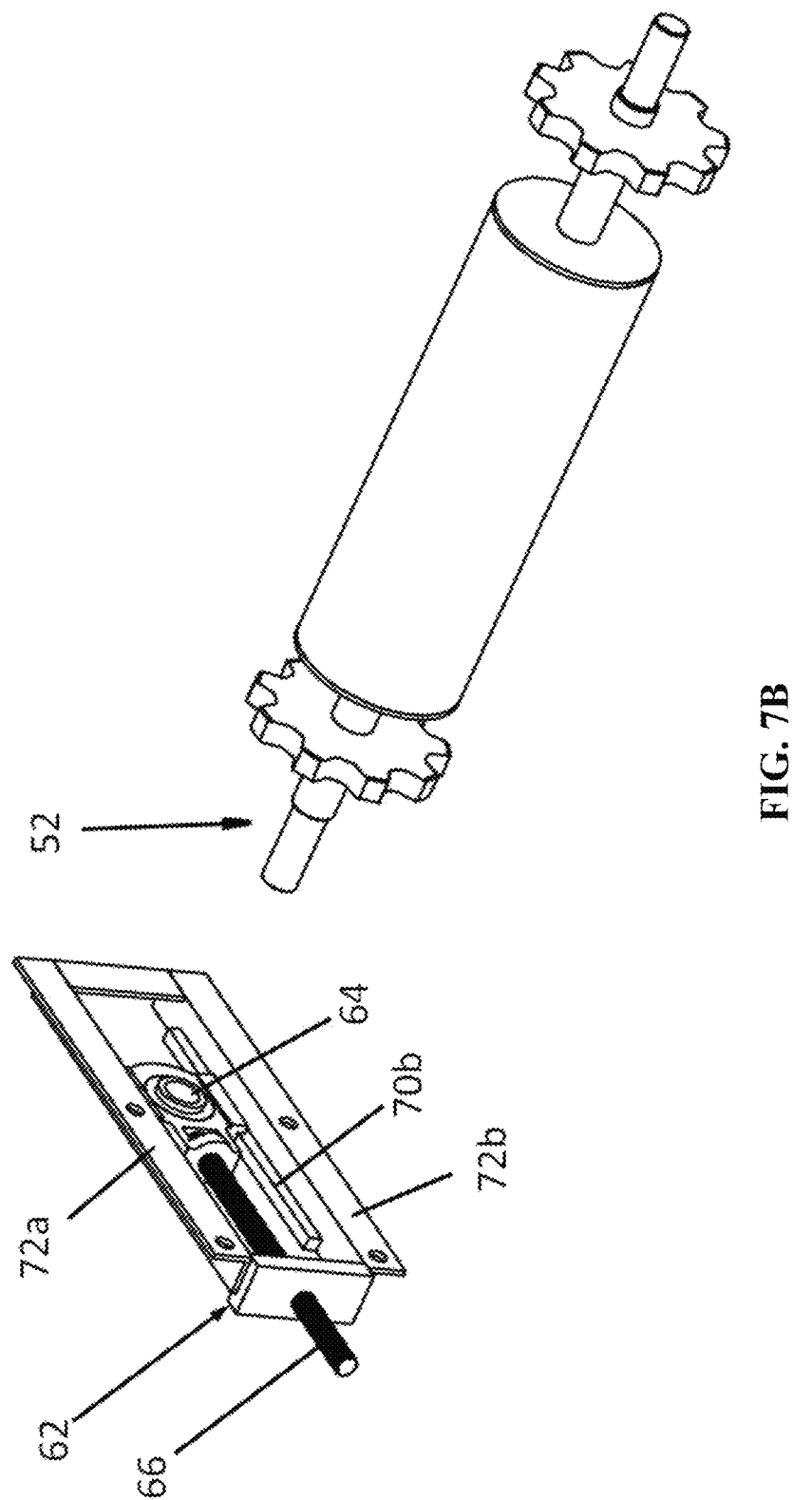

Referring to FIG. 7A, the particulars of one embodiment of the frame 28 of the modular transport assembly 14 may be appreciated. In that regard, the frame 28 may comprises side panels 54a and 54b with cross bars 56 for structural stability. If so desired, as shown in FIG. 7B specifically, diagonal ties 72 may be employed to further buttress the frame against the forces borne by transporting heavy materials. In that regard, other details may be appreciated.

In many conveyor systems, a mechanism for maintaining effective tension on the conveyor belt is important in maintaining effective transport of materials. Tension is adjusted to obtain the correct amount of tension in the belt and chain in order for the chain to mesh with the drive and idler sprockets without slipping, but also to enable tension to be loosened when necessary to remove the chain from the sprockets. Such mechanisms include take-up bearings on the idler shaft, where such bearings may be adjusted to apply appropriate conveyor belt tension. Typically, the take up bearings for the idler shaft and the flange bearings for the drive roller shaft of a conveyor system are attached to the outside of the main structural rail system for the volumetric mixer. This allows for more space to fit all the components but by definition requires that the bearing system be installed after the belt is installed and hence the belt cannot be tensioned until it is installed inside the aggregate bin.

Figure 7C:
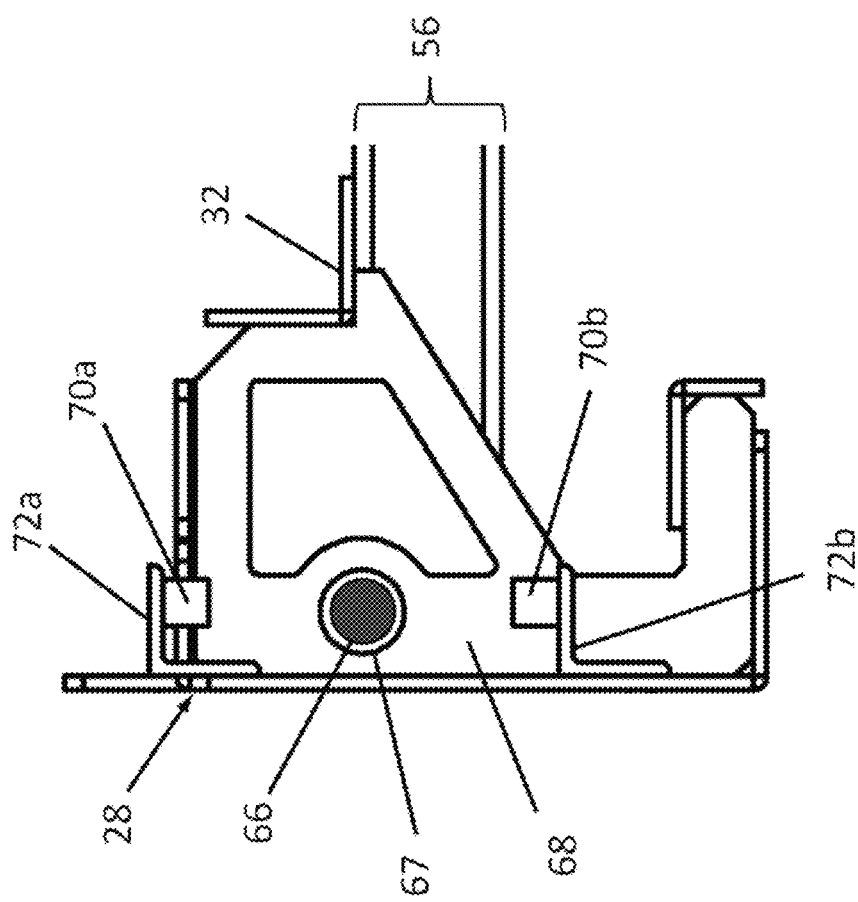
Figure 7D:
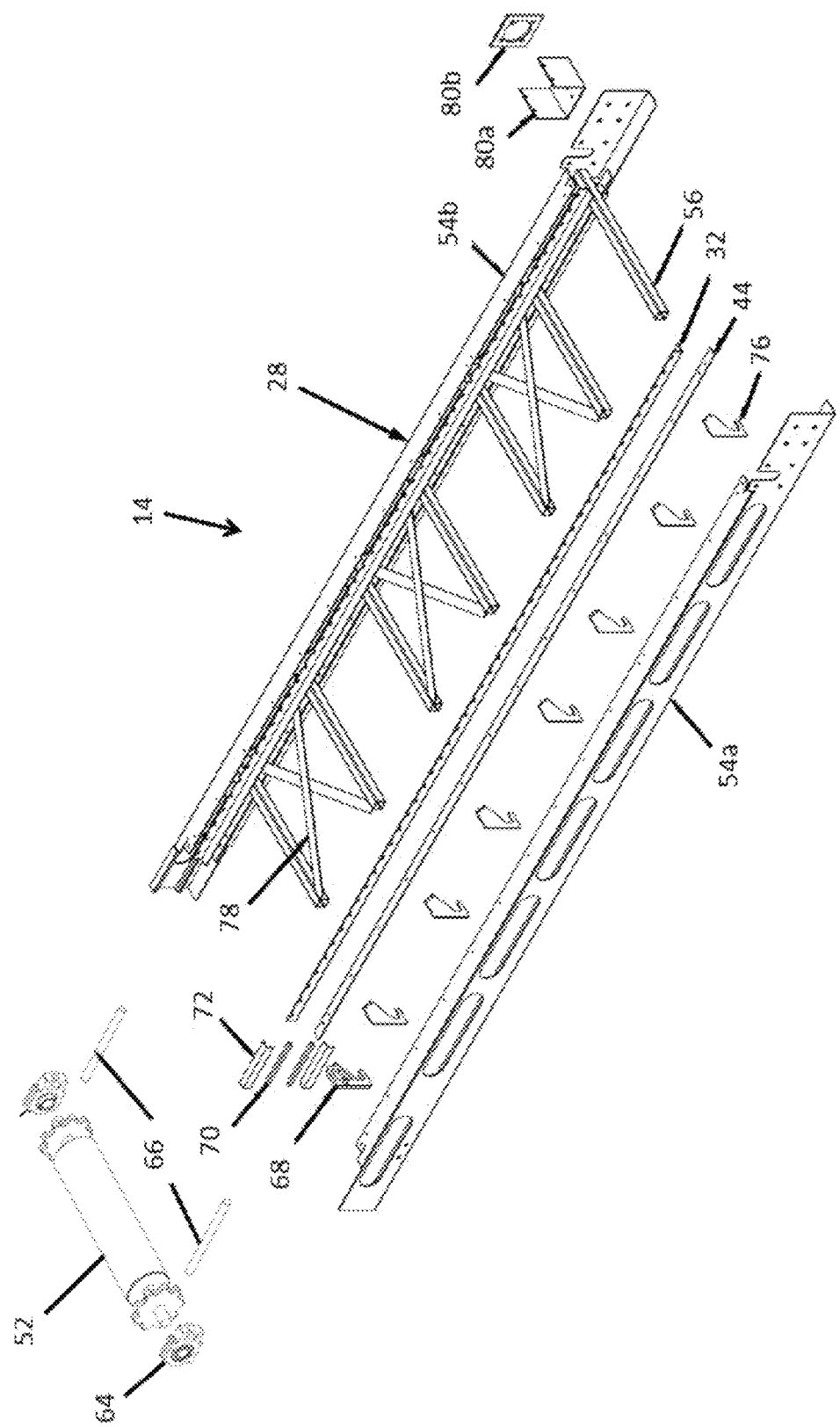

In embodiments of the invention herein, the modular cassette conveyor system integrates a take-up bearing system within the conveyor frame. Referring to FIG. 7B through 7D, one embodiment of a compact modular transport assembly may be described that includes an effective mechanism for maintaining appropriate belt tension. In that regards, a take-up bearing assembly 62 is secured within the conveyor system frame 28 in which the assembly 62 comprises a bearing 64 for supporting the idler axle 52. In one embodiment of the take-up bearing assembly 62, the take-up bearing 64 is configured to linearly ride on a first and second rail 70a, 70b, each supported by a support channel 72a, 72b, respectively. The particular configuration of the housing of the bearing 64, as well as the particular configuration of the rails 70a, 70b, and support channel 72a, 72b, is not critical, and may be configured as desired to make an effective and efficient modular conveyor system with appropriate tensioning functionality.

Linear movement of the take-up bearing 64 may be accomplished by employing, at least in one embodiment, a length of threaded rod 66 coupled to the housing of the take-up bearing 64 and leveraged against a take-up bearing plate 68 comprising a hole 67 through which the threaded rod 66 may pass and against which a nut (not shown) may be turned to draw the rod linearly through the take-up bearing plate hole 67 and, thus, move the take-up bearing 62 linearly along rails 70a, 70b. If desired, the take-up bearing plate 68 may comprise a shoulder for supporting the roller rail 32. In that regard, referring specifically to FIG. 7D, the side rail 54a of frame 28 may be supported by a plurality of gusset plates 76 shaped similarly to take-up bearing plate 68, each with a shoulder for supporting the roller rail 32.

The frame may be optionally reinforced with diagonal tie bars 78 in addition to the cross-bars 56, if so desired. The frame preferably also supports a motor support bracket assembly 80 comprising individual components 80a, 80b that may be made of any configuration suitable for supporting a drive motor to rotate the drive axle. As with the idler shaft, the motor shaft is also preferably supported by a plurality of bearings to provide efficient movement of the conveyor belt.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A materials mixing system, comprising:
   a plurality of bins concurrently disposed over a conveyor assembly removably engaged within said materials mixing system, said conveyor assembly operable to transport one or more materials received from said plurality of bins from one position to another position within the materials mixing system, said conveyor assembly removable as a unitary module from said materials mixing system, said modular conveyor assembly comprising:
   a frame including a first side panel opposite a second side panel;
   a motor driven axle including a motor coupled to a drive axle;
   an idler axle, each of said motor driven axle and said idler axle rotationally supported in said elongate frame proximate opposite frame ends and generally perpendicular to a longitudinal axis of said frame;
   a belt circuitously disposed about said motor driven axle and said idler axle;
   a mixing assembly configured to mix said one or more materials transported by said modular conveyor assembly, and
   a dispensing mechanism operable to deliver said mixture of said one or more materials to a desired location.

2. The system of claim 1, wherein said modular conveyor assembly further comprises a first chain and a second chain, each of said first and second chains circuitously disposed about said motor-driven axle and said idler axle one of said first or second chains disposed along first or second sides of said belt.

3. The system of claim 2 wherein said modular conveyor assembly further comprises a plurality of tabs joined to one or more of the links of said first or second chains, said plurality of tabs extend inwardly to connect to corresponding sides of said belt.

\* \* \* \* \*